Figure 1:
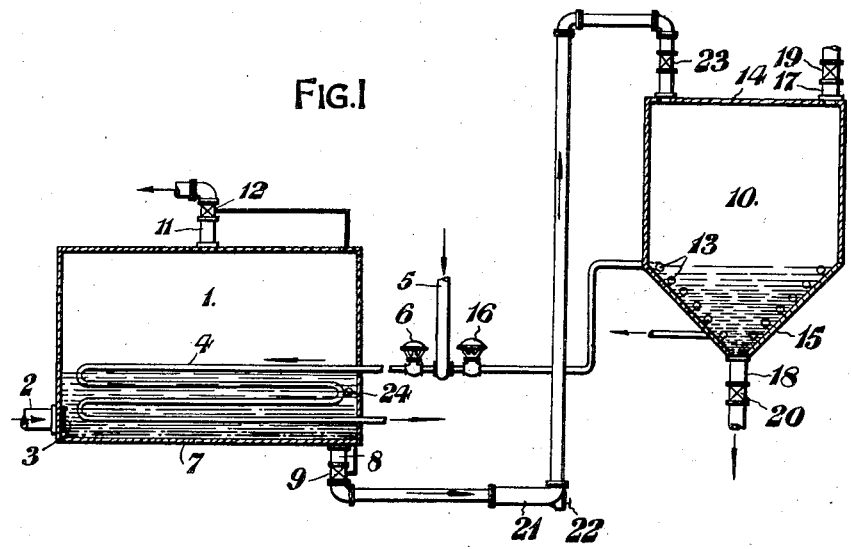

Aug. 2, 1932.  K. J. R. ROBERTSON  1,869,826
SEPARATING PLANT FOR SOLUTIONS IN VOLATILE SOLVENTS
Filed June 12, 1929

INVENTOR
K.J.R. ROBERTSON
BY
ATTORNEY

Patented Aug. 2, 1932

1,869,826

UNITED STATES PATENT OFFICE

KENNETH JAMES RENNIE ROBERTSON, OF LONDON, ENGLAND, ASSIGNOR TO CARRIER ENGINEERING COMPANY LIMITED, OF LONDON, ENGLAND

SEPARATING PLANT FOR SOLUTIONS IN VOLATILE SOLVENTS

Application filed June 12, 1929, Serial No. 370,424, and in Great Britain March 2, 1929.

This invention relates to a plant for cleaning articles by removing grease and other soluble matter therefrom, and has more especial reference to a continuous cleaning plant in which a succession of articles are subjected to a vapour solvent.

A vapour cleaning plant wherein articles to be cleaned are traversed through a vapour zone where condensation of the vapour is effected on the articles, any grease and soluble matter being removed in solution in the condensate, is described in co-pending application Serial No. 302,038, and the invention will be described with more particular reference to such plant, although applicable generally to other cleaning plants and processes in which volatile solvents are employed either in vapour or liquid form.

An object of the invention is to provide for the removal of volatile solvents from a mixture containing grease, and a further object is to completely remove any traces of solvent from the residue grease, thereby conditioning it for immediate delivery to barrels or other receptacles ready for use.

A further object, where applied to vapour baths, is to maintain the bath charged with clean vapour and provide for the automatic ejection of accumulated residue grease from the regenerating means associated with said bath.

Apparatus for separating residue from solution in volatile solvents according to the invention, comprises regenerating means for vaporizing the solvent wherein the pressure produced effects automatic ejection from said generating means of accumulated residue solute, whereby effective separation of the solvent from the grease or other matter present in the solution is effected.

A grease tank is preferably associated with the generator in which the solvent is vaporized, to which the residue is ejected, say at intervals, and heating means are provided for this grease tank which effect evaporation of any solvent remaining in the residue so that it can be returned for use and the residue e. g. grease, discharged from the tank and collected, say, in barrels.

To effect vaporization of the solvent in the generator, heating coils carrying steam may be provided near the base thereof, the temperature thus attained being adequate for the customary solvents such as trichlorethylene, and a vapour outlet is provided in the upper part of the generator through which the vapour is returned to the bath when applied to a vapour cleaning plant or to a condenser, if the solvent is to be recovered as liquor.

A residue discharge conduit passes from the base of the generator and communicates with a grease tank arranged at a higher level than the generator to prevent siphoning, and stop valves are provided on said vapour outlet and discharge conduit which when closed ensure that a vapour pressure is built up within the generator sufficient to eject the residue grease and dirt to the grease tank on the discharge valve being opened.

A thermostat may be arranged in the generator to operate when the oil contained rises and so opens the valves to effect discharge of the residue to the grease tank.

Reference will now be made to the accompanying drawing where the invention is embodied and shown applied to a vapour cleaning plant.

Figure 2:
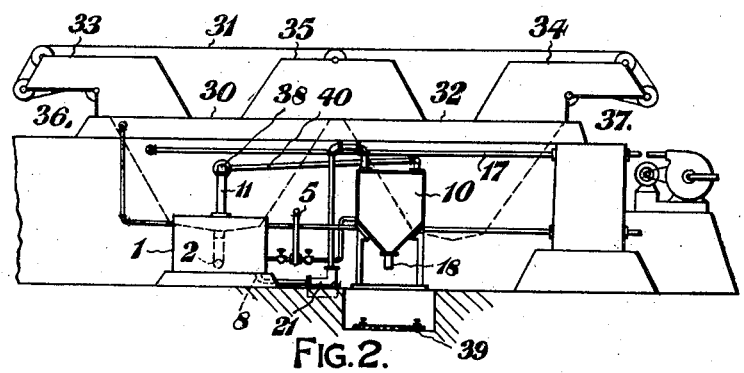

In said drawing:

Fig. 1 is a section through a solvent generator and grease tank provided in the preferred form of the invention; and Fig. 2 is a side elevation of such a generator and grease tank applied to the vapour cleaning plant as, for example described in copending applications Serial No. 302,038.

Referring first more particularly to Fig. 1 and describing the recovery plant according to the invention as applied to the recovery of solvent in a vapour cleaning process, 1 is a generator comprising a rectangular or cylindrical tank to which grease and dirt-charged condensate is fed from the vapour bath, not shown, by a conduit 2 through a one-way valve 3 which permits of the condensate flowing into the base of the generator 1 but prevents any return thereof in the direction of the vapour bath.

Located in the lower portion of the generator 1 is a stack of heating pipes 4 conveniently carrying steam when the usual solvents such as trichlorethylene are being recovered, the supply of steam from a pipe 5 being controlled say by a diaphragm valve 6.

In the base 7 of the generator 1 a discharge conduit 8 is provided including a stop valve 9 and communicating with a grease tank 10, the base 7 of the generator 1 being slightly inclined so that residue liquor is directed to the discharge 8.

A vapour outlet 11 is provided in the upper portion of the regenerator 1 to supply the regenerated vapour to the bath for cleaning purposes, and a valve 12 is included in the outlet 11.

The grease tank 10 is also provided with a stack of heating pipes indicated at 13, the residue discharge pipe 8 entering the tank 10 at the upper wall 14 thereof, and the residue falling to the base 15 in the locality of the heating coils 13 to which steam or other medium is supplied from the pipe 5 under the control of a diaphragm valve 16.

An outlet 17 for vapour is also arranged in the upper wall 14 of the tank 10, and the base 15 is shown convergent and terminates in a grease discharge 18, suitable stop valves 19 and 20 being shown associated with said vapour outlet 17 and said conduit 18 respectively.

In operation grease and dirt-charged condensate is supplied to the generator 1 through the conduit 2, say by gravity, and the condensate is revaporized under the influence of the steam coils 4 so that the generator 1 becomes charged with solvent vapour and the valves 9 and 12 being closed a considerable pressure is built up within the generator 1 so that on the valve 9 being opened the residue grease and dirt on the base 7 of the generator 1 is automatically ejected, the grease passing to the tank 10 and any sludge or dirt collecting at the bottom of the pipe 8 where a sump 21 is arranged with a drain cock 22 so that accumulations of sludge and dirt can be removed at intervals as required.

After ejection of the residue the valve 9 is closed and the valve 12 on the vapour outlet 11 opened, whereupon a supply of clean revaporized solvent is fed to the bath.

Further regeneration of the solvent from the residue grease is then effected in the tank 10 where the heat emanating from the steam coils 13 causes the evaporation of any solvent remaining in association with the grease, the regenerated vapour being returned say to the bath through the outlet 19 while solvent-free grease or other residue is run off through the discharge 18 and collected, say in barrels, for lubricating or other purposes.

Conveniently the operation of the valves 9 and 12 may be rendered automatic at the instance of the pressure prevailing in the generator 1, or alternatively the valve 9 may be arranged so as to normally be closed with the valve 12 open so that a supply of vapour is continually available through the outlet 11 to the bath, and manual operation may cause the closing of the valve 12 and the opening of the valve 9 to effect automatic ejection of residue grease from the generator 1 to the grease tank 10.

This operation can be effected automatically by a thermostat 24 located in the generator 1 and operating on the temperature rising as the result of residue accumulating in the base of the generator.

Similarly the supply of heat to the stacks of steam pipes 4 and 13 may be regulated automatically at the instance of thermostats regulating the opening of the diaphragm valves 6 and 16 to admit more or less steam to said stacks, and a second valve 23 may be provided in the conduit 8 adjacent the tank 10 to isolate the tank when required, while as indicated the grease tank 10 is arranged at a higher level than the generator 1 preventing any possibility of a siphon action taking place.

Referring now to Fig. 2 where a cleaning plant as described and illustrated in co-pending application Serial No. 370,423, is shown including the solvent recovery and grease separating plant according to the invention, 30 is the vapour bath through which the articles to be cleaned are traversed on a conveyor 31 which subsequently takes the articles through a liquor trap 32, canopies in the form of metal hood members 33 and 34 being provided over the entry 36 and discharge 37 of the articles from the bath and liquor trap to prevent loss and dissipation of the vapour solvent employed, by diffusion into the ambient atmosphere, and the canopies 33 and 34 being extended inwardly to provide a cover 35 so as to leave the bath open only to atmosphere at the entry 36 and the discharge 37.

In the embodiment illustrated the canopies 33 and 34 also serve to carry the conveyor 31 by means of which the articles are traversed through the cleaning zone of the vapour bath 30 and the cooling zone provided in the liquor trap 32.

The vapour outlet 11 of the generator 1 connects with the horizontal inlet pipe 38 of the vapour bath through which the vapour is conveyed direct to the cleaning zone, while the grease-charged condensate from the bath is returned to the generator 1 through a conduit 2 at the rear of the generator suitably sloped so that the condensate flows into the generator by gravity.

As will be seen the recovery plant is conveniently located alongside the cleaning bath and a suitable track such as 39 can be provided to facilitate the transport of barrels to the grease tank 10 in order that they may be filled with residue grease removed from the articles cleaned, and discharging through the conduit 18 of the grease tank 10.

The vapour outlet 17 of the grease tank 10 is shown connected to the bath inlet 38 by a transverse pipe 40 so that vapour recovered in the tank is supplied direct to the bath 30.

Steam for the heating coils 4 and 13 may be provided from any suitable source, not shown in the drawing, while if desired other means for raising the generator 1 and the tank 10 to a temperature sufficient to effect vaporization of the solvent may be employed, for instance, the gas burners illustrated in co-pending application Serial No. 302,038, although the solvent usually employed, namely trichlorethylene, vaporizes readily under the influence of the heat emanating from the steam pipes which by reason of their cleanliness and ease of control are consequently preferred. At the same time the maximum temperature emanating from the steam pipes is insufficient to cause the residue to evaporate and this is a considerable advantage, as if such were the case grease would pass into the bath and be deposited upon the articles and the cleaning operation adversely affected.

The recovery plant according to the invention provides for the effective separation of the solvent from the residue matter contained in the condensate in an economical manner, and although described more specifically as associated with a vapour cleaning plant, is as readily applicable to other solvent cleaning plants, and in fact to any process in which the separation of a volatile solvent from the dissolved matter is required.

What I claim is:

1. A method of recovering a volatile solvent from a solution containing grease, consisting in heating the solution to evaporate the solvent, drawing off the solvent in vapor form to a vapor bath, automatically causing the vapor to be confined responsive to rise in temperature to build up a pressure when it is desired to remove the separated grease, and expelling the grease by said pressure.

2. A method of separating grease from a solution, consisting in feeding the solution from a vapor bath to a separating chamber, heating the solution within the separating chamber, vaporizing the solvent to gaseous form, thereby leaving the grease as a residue, drawing off the vapor to the vapor bath while retaining the grease within the separating chamber, and automatically causing the vapor to be confined responsive to change in thermostatic conditions within the chamber to build up a pressure when it is desired to remove the grease, and permitting the grease to be expelled by said pressure.

3. A combination of apparatus for separating grease from a solvent solution, comprising means for feeding solution from a vapor bath to an accumulating chamber, means for heating the solution in said chamber to vaporize volatiles, first means for permitting said volatiles to be removed from the chamber, second means for permitting removal of grease and residue from the chamber, said first means being adapted responsive to thermostatic means operative upon a rise in temperature within the chamber above a predetermined point to confine the volatiles in vaporous form within the chamber so that a pressure will be built up whereby the grease and residue will be expelled from said chamber by opening the second means.

4. A combination of apparatus for recovering solvent from a solution containing grease, comprising a chamber, an inlet for admitting solution from a vapor bath to the chamber, an outlet from the chamber for sending solvent in vaporous form to the vapor bath, an outlet from the chamber for permitting the expulsion of grease, heating means within the chamber for evaporating solvents from said solution and precipitating grease therefrom and other residue, means in said inlet and two outlets for enabling a pressure to be built up within the chamber due to confinement of vapors therewithin, the means in the outlets being arranged to operate under thermostatic control whereby one of them will be open while the other is shut said pressure causing the grease and residue to be expelled upon the opening of the outlet therefor.

In testimony whereof I affix my signature.

KENNETH JAMES RENNIE ROBERTSON.